United States Patent [19]

Yoshimura et al.

[11] Patent Number: 4,641,620

[45] Date of Patent: Feb. 10, 1987

[54] FUEL INJECTION CONTROL MEANS FOR INTERNAL COMBUSTION ENGINES

[75] Inventors: Takeshi Yoshimura, Higashi-Hiroshima; Mutsuro Sameshima, Hiroshima; Toru Nakanishi, Kure; Shigeo Kato, Higashi-Hiroshima, all of Japan

[73] Assignee: Mazda Motor Corporation, Hiroshima, Japan

[21] Appl. No.: 765,242

[22] Filed: Aug. 13, 1985

[30] Foreign Application Priority Data

Aug. 14, 1984 [JP] Japan .................. 59-169676

[51] Int. Cl.⁴ .......................................... F02M 35/10
[52] U.S. Cl. ................... 123/432; 123/445; 123/472
[58] Field of Search .............. 123/308, 432, 445, 472

[56] References Cited

U.S. PATENT DOCUMENTS

| | | |
|---|---|---|
| 4,140,088 | 2/1979 | de Vulpillieres . |
| 4,270,500 | 6/1981 | Nakagawa et al. ............ 123/432 X |
| 4,309,971 | 1/1982 | Chiesa et al. ........................ 123/480 |
| 4,315,491 | 2/1982 | Takeda ............................. 123/445 X |
| 4,359,991 | 11/1982 | Stumpp et al. ....................... 123/478 |
| 4,413,601 | 11/1983 | Matsuoka et al. ................... 123/480 |
| 4,418,674 | 12/1983 | Hasegawa et al. ................... 123/491 |
| 4,445,483 | 5/1984 | Hasegawa ........................... 123/492 |
| 4,471,742 | 9/1984 | Kishi ................................... 123/478 |
| 4,492,203 | 1/1985 | Yutaka ................................ 123/478 |
| 4,513,700 | 4/1985 | Hayashida ...................... 123/445 X |
| 4,548,175 | 10/1985 | Kawai et al. ........................ 123/308 |

FOREIGN PATENT DOCUMENTS

| | | |
|---|---|---|
| 0083934 | 7/1976 | Japan . |
| 0043616 | 11/1978 | Japan . |
| 0084128 | 7/1979 | Japan . |
| 0156920 | 12/1979 | Japan . |
| 0005473 | 1/1980 | Japan . |
| 0206744 | 12/1982 | Japan . |
| 0062315 | 4/1983 | Japan ................................. 123/432 |
| 2005348 | 4/1979 | United Kingdom . |

Primary Examiner—Willis R. Wolfe, Jr.
Attorney, Agent, or Firm—Fleit, Jacobson, Cohn & Price

[57] ABSTRACT

An engine intake system including a primary and secondary intake passages which are separated from each other and are respectively provided with a primary and a secondary fuel injection valve. The secondary intake passage is closed and the secondary fuel injection valve is inoperable for light load engine operation. When the secondary fuel injection valve is restarted to operate for heavy load engine operation, the quantity of fuel supply is momentarily increased to avoid any stepwise change in the engine output torque. The amount of the increase in the fuel supply is increased in response to a decrease in the engine speed. When operation of the secondary fuel injection valve is stopped, the fuel supply is decreased.

9 Claims, 7 Drawing Figures

FIG. 2
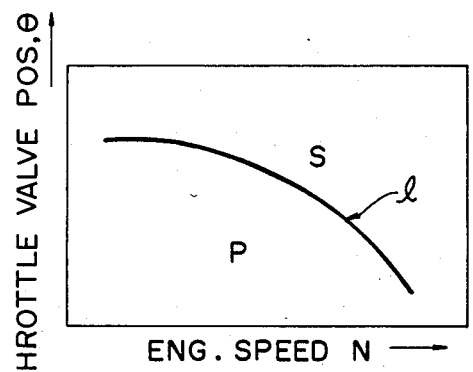
FIG. 3(b)
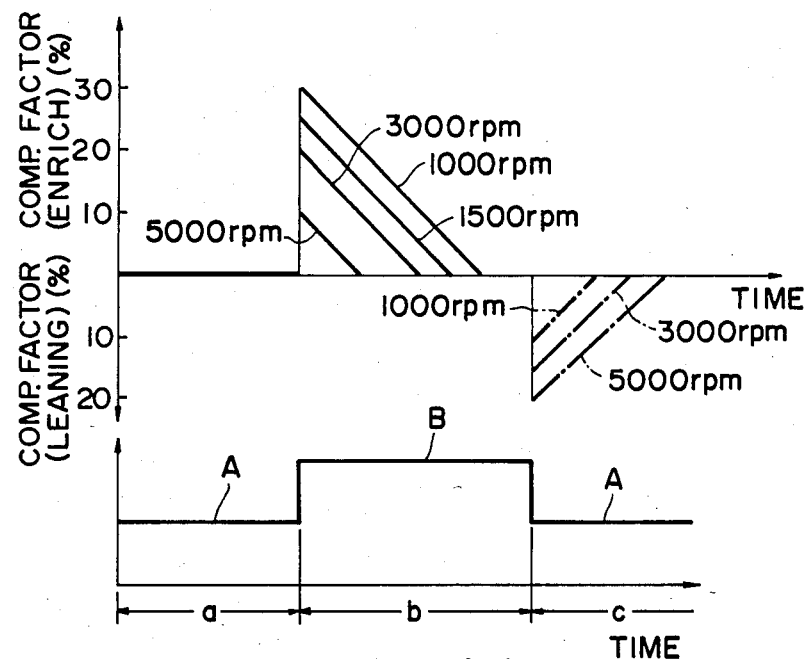
FIG. 3(a)

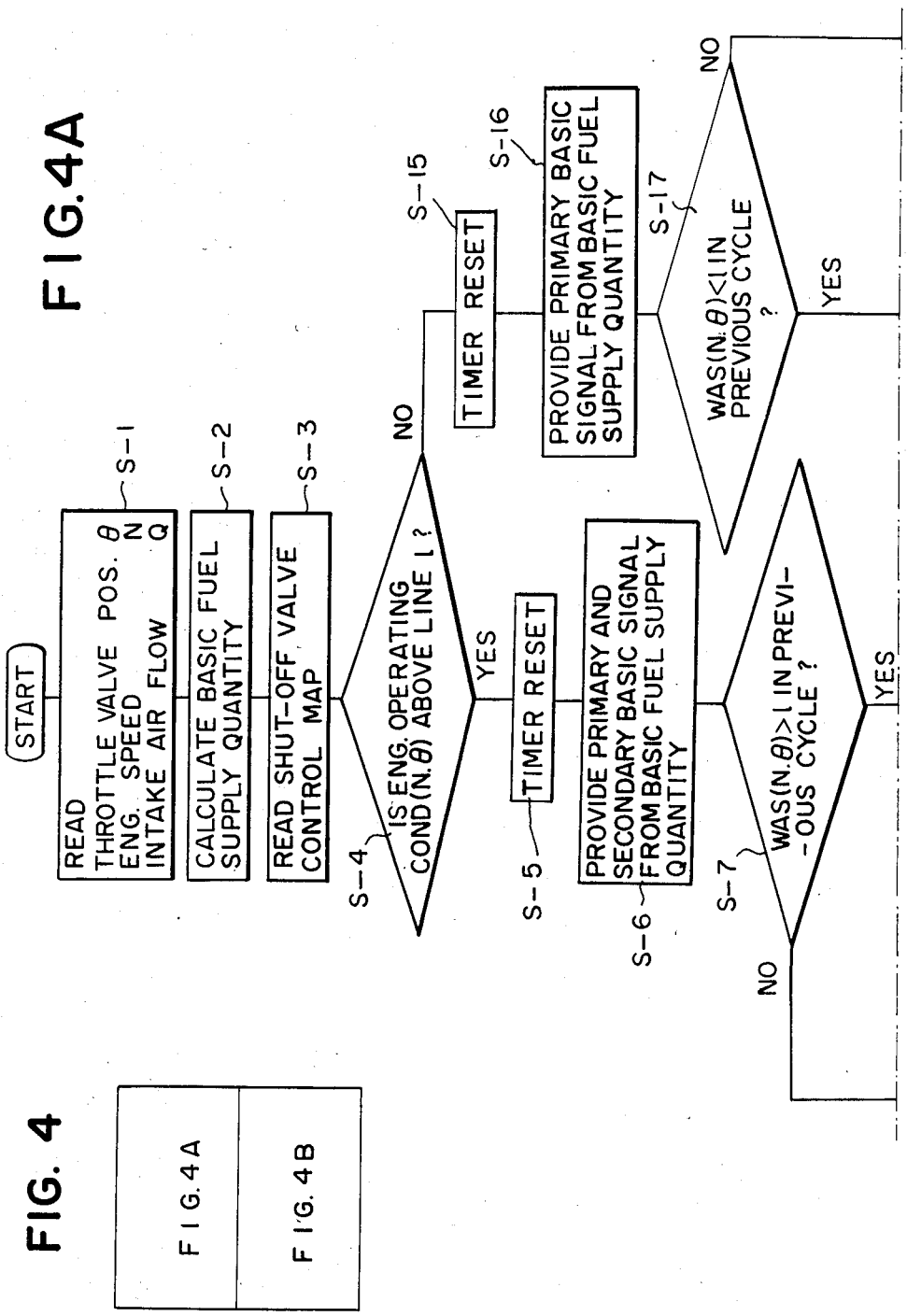

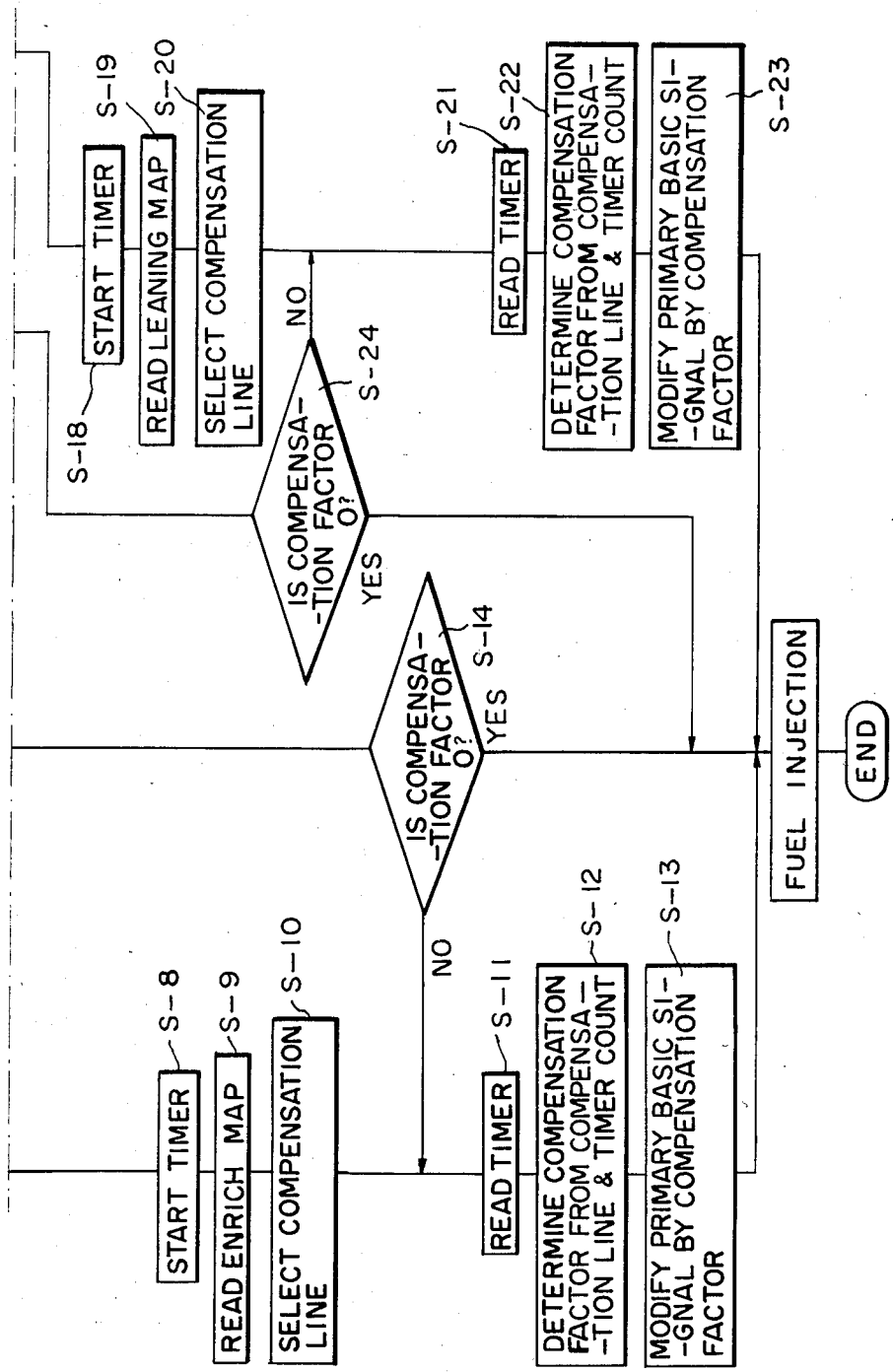

FUEL INJECTION CONTROL MEANS FOR INTERNAL COMBUSTION ENGINES

BACKGROUND OF THE INVENTION

1. Field of the Invention

The present invention relates to fuel injection control means for internal combustion engines, and more particularly to fuel injection control means for engines having heavy duty fuel injection valve means and light duty fuel injection valve means, the operation of which are controlled in accordance with the loads on the engines.

2. Description of the Prior Art

Conventionally, it has been known in an internal combustion engine to provide a primary intake passage and a secondary intake passage which are substantially independent from each other but leading to the same combustion chamber. The secondary intake passage is usually provided with a shutoff valve which is closed under light load engine operation so that the intake air is drawn substantially through the primary intake passage for light load operation. It has also been proposed in this type of intake system to provide a primary fuel injection valve and a secondary fuel injection valve, respectively, in the primary and secondary intake passages, and to operate primary fuel injection valve throughout the engine operating range but to operate the secondary fuel injection valve under the heavy load engine operation wherein the secondary intake passage is opened. This type of fuel injection control is shown for example in Japanese patent publication No. 53-43616 published on Nov. 21, 1978.

In this type of fuel injection control, it has been experienced that a stepwise change in the engine output torque is produced when the operation of the secondary fuel injection valve is started or stopped, even though the quantity of fuel supply is precisely calculated in accordance with the engine operating condition. This stepwise change in the engine output torque is caused by the fact that when the fuel injection from the secondary fuel injection valve is stopped, the liquid film flow on the wall surface of the secondary intake passage is evaporated and drawn into the combustion chamber making the air-fuel mixture temporarily rich. When the fuel supply through the secondary fuel injection valve is started, a part of the fuel is consumed to make the wall surface of the secondary intake passage wet so that the airfuel mixture becomes lean.

In order to eliminate the above problems, the quantity of fuel supply may be temporarily increased when the fuel supply through the secondary fuel injection valve is started. Further, the quantity of the fuel supply may be decreased when the operation of the secondary fuel injection valve is stopped. It has been found, however, that the simple increase or decrease of the quantity of fuel supply is not sufficient to eliminate the stepwise change in the engine output torque.

SUMMARY OF THE INVENTION

It is therefore an object of the present invention to provide engine fuel injection control means which does not cause stepwise changes in the engine output torque.

Another object of the present invention is to provide, in an engine intake system having a primary and secondary intake passages which are respectively provided with a primary and secondary fuel injection valves, engine fuel injection control means which can substantially eliminate stepwise changes in the engine output torque when the secondary fuel injection valve is brought into and out of operation.

According to the present invention, the above and other objects can be accomplished by providing compensation means for determining a compensation factor which changes in accordance with the engine speed so that the quantity of fuel supply is compensated for when the secondary fuel injection valve is brought into or out of operation. Thus, the present invention provides an engine intake system including first intake passage means leading to combustion chamber means, second intake passage means substantially separated from said first intake passage means and leading to said combustion chamber means, shut-off valve means provided in said second intake passage means for closing said second intake passage means under light load engine operation, first fuel injection valve means provided in said first intake passage means, second fuel injection valve means provided in said second intake passage means, fuel injection control means for operating said first fuel injection valve means under light load engine operation and for operating said first and second fuel injection valve means under heavy load engine operation to provide a metered quantity of fuel supply, said control means including compensating means for momentarily changing the quantity of fuel supply when the operating condition is changed between light load and heavy load engine operations by an amount which varies in accordance with engine speed whereby a stepwise change in engine output torque can be avoided. In one mode of the present invention, when the second fuel injection valve starts to operate, the quantity of fuel supply is momentarily increased by an amount which decreases as the engine speed increases. In another mode, when the operation of the second fuel injection valve is stopped for light load engine operation, the quantity of fuel supply is momentarily decreased by an amount which increases as the engine speed increases. It is preferable to gradually decrease the amount of compensation of the fuel supply. According to the present invention, it becomes possible to precisely control the air-fuel ratio of the mixture so that the aforementioned stepwise change in the engine output torque can be substantially eliminated.

The above and other objects and features of the present invention will become apparent from the following description of a preferred embodiment taking reference to the accompanying drawings.

BRIEF DESCRIPTION OF THE DRAWINGS

FIG. 2 is a diagram showing one example of a map for controlling the operation of a shut-off valve in the secondary intake passage;

FIG. 3(a) is a diagram showing operations of the primary and secondary fuel injection valves;

FIG. 3(b) is a diagram showing an example of fuel compensation factor; and,

FIGS. 4, 4A, and 4B are flow charts showing the operation of the control circuit.

DESCRIPTION OF THE PREFERRED EMBODIMENT

Figure 1:
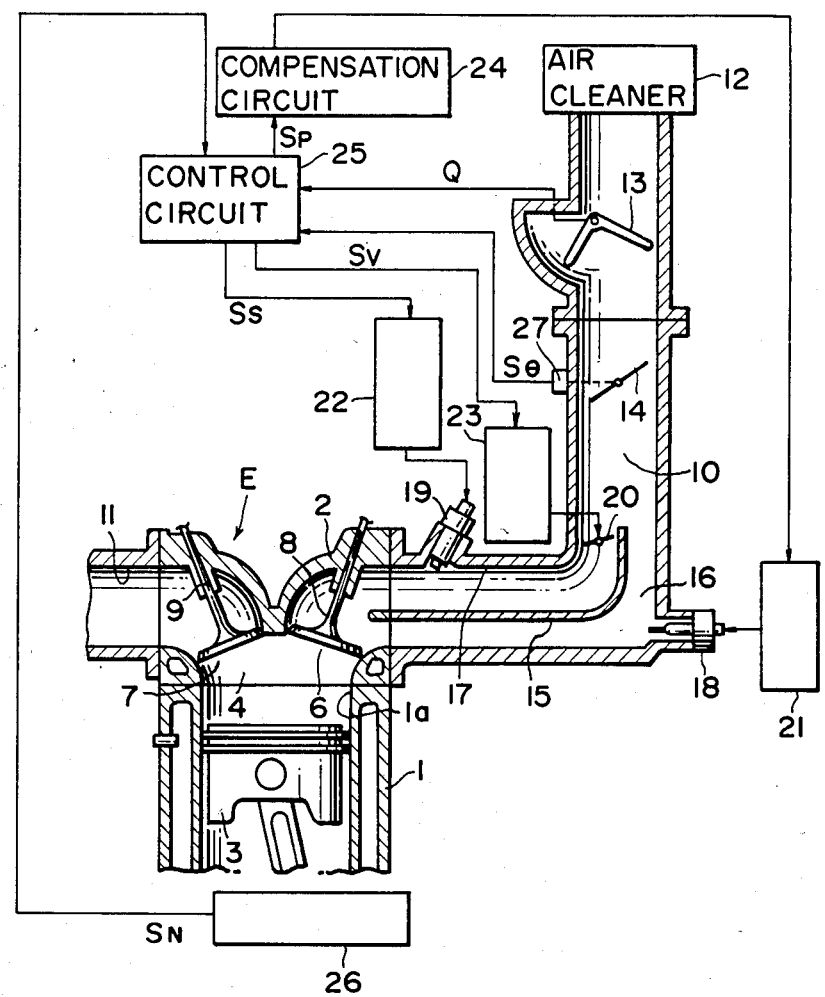
FIG. 1 is a diagrammatical illustration of an engine intake system having a fuel injection control device in accordance with one embodiment of the present invention.

Referring to the drawings, particularly to FIG. 1, there is shown an engine E including a cylinder block 1 having one or more cylinder bores 1a. A cylinder head 2 is attached to the upper end of the cylinder block 1 and a piston 3 is disposed in the cylinder bore 1a for reciprocating movement therein to thereby define a combustion chamber 4 in the cylinder bore 1a. The cylinder head 2 is formed with an intake port 6 and exhaust port 7 to open to the combustion chamber 4. The intake port 6 is provided with an intake valve 8 and the exhaust port 7 is provided with an exhaust valve 9. The intake port 6 is connected with an intake passage 10 and the exhaust port 7 is connected with an exhaust passage 11. The intake passage 10 is provided at an upstream end with an air cleaner 12 and a manually operated throttle valve 14 which is located downstream of the air cleaner 12. Between the air cleaner 12 and the throttle valve 14, there is provided an airflowmeter 13 which produces an airflow signal Q corresponding to the airflow through the intake passage 10.

In the downstream portion, the intake passage 10 is provided with a longitudinally extending partition wall 15 which divides the passage 10 into a primary intake passage 16 and a secondary intake passage 17. A primary fuel injection valve 18 is provided in the primary intake passage 16 and a secondary fuel injection valve 19 is provided in the secondary intake passage 17. The secondary intake passage 17 is further provided with a shut-off valve 20 which is adapted to be actuated by a shut-off valve actuator 23 between an open and closed positions. The fuel injection valves 18 and 19 are provided with injection valve actuators 21 and 22, respectively.

In order to control the actuators 21, 22 and 23, there is provided a control circuit 25 which may be a microprocessor. The airflow signal Q from the airflowmeter 13 is applied to the control circuit 25. Further, the throttle valve 14 is provided with a throttle valve position detector 27 which produces a throttle valve position signal $S\theta$. The engine is also provided with an engine speed detector 26 which produces an engine speed signal $S_N$. The signals $S\theta$ and $S_N$ are applied to the control circuit 25.

The control circuit 25 has a shut-off valve control map as shown in FIG. 2. When the throttle valve signal $S\theta$ and the engine speed signal $S_N$ show that the engine operating condition is in the heavy load range S, which is the region above the line l, the control circuit 25 produces a valve open signal $S_V$ which is applied to the valve actuator 23 to open the shut-off valve 20. The control circuit 25 makes a calculation based on the input signals Q, $S_V$ and $S_N$ and determines the basic fuel quantity in accordance with the engine operating condition as judged by the signals Q, $S_V$ and $S_N$. The basic fuel quantity is shared by the primary and secondary fuel injection valves 18 and 21 under heavy load operation, and the control circuit 25 applies a primary fuel injection signal Sp to the primary fuel injection valve 18 and a secondary fuel injection signal $S_S$ to the secondary fuel injection valve 19.

When it is judged that the engine operating condition is in the light load region P, which is below the line l, the valve open signal $S_V$ is interrupted so that the valve actuator 23 closes the shut-off valve 20. At the same time, the secondary fuel injection signal $S_S$ is also interrupted and the primary fuel injection signal Sp becomes a value corresponding to the basic fuel quantity.

FIG. 3(a) shows the operation of the primary and secondary fuel injection valves 18 and 19. In the time period a, only the primary fuel injection valve 18 is operated for light load operation as shown by A. In the time period b, the primary and secondary fuel injection valves 18 and 19 are operated for heavy load operation as shown by B. Further, in the time period C, the load on the engine is decreased so that only the primary fuel injection valve 18 is operated. When the fuel supply is introduced only through the primary fuel injection valve 18, the wall surface of the secondary intake passage 17 becomes dry so that a part of the fuel injected from the secondary fuel injection valve 19 is consumed for wetting the wall surface when the operation of the secondary fuel injection valve 19 is restarted, making the air-fuel ratio of the mixture lean. Further, when the operation of the secondary fuel injection valve 19 is stopped, the liquid fuel deposited on the wall surface of the secondary intake passage 17 is evaporated and mixed with the intake air making the mixture rich. In order to compensate for the aforementioned changes in the air-fuel ratio, the control circuit 25 includes a compensation circuit 24 for modifying the primary fuel injection signal Sp.

FIG. 3(b) shows maps for determining compensating factors which are used for modifying the primary fuel injection signal Sp. Solid lines in FIG. 3(b) represent enriching compensation lines for different engine speeds, whereas the broken lines represent leaning compensation lines for different engine speeds. It will be noted in FIG. 3(b) that the compensating factor for enriching the mixture during the restart of the operation of the secondary fuel injection valve 19 decreases as the engine speed increases. More specifically, at an engine speed of 1000 rpm, the compensating factor is approximately 30% to provide an additional fuel supply of approximately 30% of the basic fuel quantity. However, at an engine speed of 5000 rpm, the compensating factor is approximately 10% to provide an additional fuel supply of approximately 10% of the basic fuel quantity. It should further be noted that the compensating factor is gradually decreased as time passes.

The compensating factor is thus increased in accordance with a decrease in the engine speed. This is because the quantity of fuel supply is relatively small under a low speed operation but nevertheless a large part of the fuel is deposited on the wall surface of the secondary intake passage 17 since the intake air flow speed is relatively low and satisfactory atomization of fuel cannot be accomplished.

In the case where the engine operating condition is changed from the heavy load region S to the light load region P, the operation of the secondary fuel injection valve 19 is stopped and fuel is injected only through the primary fuel injection valve 18. At this moment, the basic fuel quantity is compensated for in accordance with one of the leaning compensation lines corresponding to the actual engine speed. The leaning compensation factor decreases as the engine speed decreases. For example, at an engine speed of 1000 rpm, the compensating factor is approximately 10% to decrease the quantity of fuel supply by approximately 10% of the basic quantity, whereas at an engine speed of 5000 rpm, the compensating factor is approximately 20% to decrease the fuel supply by approximately 20% of the basic quantity. This is because of the fact that the quantity of fuel deposited on the wall surface of the secondary intake passage 17 is relatively small under low speed operation. It will further be noted that the compensating factor is gradually decreased as time passes.

The operation of the control circuit 25 is shown by the program flow chart in FIG. 4. After start, the throttle valve position θ, the engine speed N and the intake air flow Q are read in step S-1 and the basic fuel supply quantity is calculated in step S-2. Thereafter, the shut-off valve control map is read in step S-3 and a judgement is made in step S-4 as to whether or not the engine operating condition is above the line l. If the result of that judgement is YES, the process proceeds to step S-5 where a timer is reset and then the basic fuel supply quantity is divided into two in step 6 to thereby provide a primary basic signal and a secondary basic signal, which are applied, respectively, to the primary and secondary fuel injection valves 18 and 19.

A judgement is then made in step S-7 as to whether the engine operating condition was also above the line l in the previous cycle of routine. If the result of judgement in step S-7 is NO, the timer is started in step S-8 and the enriching compensation map shown by the solid lines in FIG. 3(*b*) is read in step S-9. Then, one of the compensation lines is selected in step S-10 in accordance with the engine speed. Thereafter, the count of the timer is read in step 11 and the compensating factor is determined in step 12 in accordance with the selected compensation line and the count of the timer. The process then proceeds to step 13 where the primary basic signal is modified by the compensating factor. Fuel injection is carried out in accordance with the modified primary signal and the previously determined secondary basic signal. The process then comes to the end and the routine is repeated from step S-1. If the judgement in step S-7 is YES, a judgement is made in step 14 as to whether the compensating factor is 0 or not. If the judgement in step 14 is NO, the process is returned to step S-11 and the same steps are repeated. If the result of the judgement in step 14 is YES, the process comes to the end and the routine is repeated from the step S-1.

If the judgement in step S-4 is NO, the timer is reset in step S-15 and a primary basic signal is produced in step S-16 to operate the primary fuel injection valve 18 only. Then, a judgement is made in step 17 as to whether the engine operating condition was lower than the line l in the previous cycle of the routine. If the result of judgement is NO, the timer is started in step S-18 and the leaning compensation map, as shown by broken lines in FIG. 3(*b*), is read in step S-19. Thereafter, one of the leaning compensation lines is selected in step S-20 in accordance with the engine speed. Then, the count of the timer is read in step S-21 and the compensating factor is determined in step S-22 in accordance with the selected compensation line and the count of the timer. Thereafter, the primary basic signal is modified in step S-23 and the primary fuel injection valve 18 is operated by the modified signal. The process then comes to the end and the routine is repeated from step S-1. If the judgement in step S-17 is YES, a judgement is made in step 24 as to whether the compensation factor is 0 or not. If the result of the judgement is YES, the process comes to the end and the routine is repeated from step S-1. At this instance, fuel injection is carried out with a quantity as determined by the primary basic signal. If the result of the judgement in step S-24 is NO, the process is repeated from step S-21.

The invention has thus been shown and described with reference to a specific embodiment, however, it should be noted that the invention is in no way limited to the details of the illustrated arrangements, but changes and modifications may be made without departing from the scope of the appended claims.

We claim:

1. An engine intake system including first intake passage means leading to combustion chamber means, second intake passage means substantially separated from said first intake passage means and leading to said combustion chamber means, shut-off valve means provided in said second intake passage means for closing said second intake passage means under a light load engine operation, first fuel injection valve means provided in said first intake passage means, second fuel injection valve means provided in said second intake passage means, fuel injection control means for operating said first fuel injection valve means under the light load engine operation and for operating said first and second fuel injection valve means under a heavy load engine operation to provide a metered quantity of fuel supply, said control means including compensating means for momentarily changing the quantity of fuel supply when operating condition is changed between the light load and heavy load engine operations by an amount which varies in accordance with engine speed whereby a stepwise change in engine output torque can be avoided, wherein said compensating means is means for momentarily increasing the quantity of fuel supply when the second fuel injection valve means is started to operate for the heavy load engine operation and is means for increasing the quantity of fuel supply by an amount which increases in response to a decrease in engine speed.

2. An engine intake system including first intake passage means leading to combustion chamber means, second intake passage means substantially separated from said first intake passage means and leading to said combustion chamber means, shut-off valve means provided in said second intake passage means for closing said second intake passage means under a light load engine operation, first fuel injection valve means provided in said first intake passage means, second fuel injection valve means provided in said second intake passage means, fuel injection control means for operating said first fuel injection valve means under the light load engine operation and for operating said first and second fuel injection valve means under a heavy load engine operation to provide a metered quantity of fuel supply, said control means including compensating means for momentarily changing the quantity of fuel supply when operating condition is changed between the light load and heavy load engine operations by an amount which varies in accordance with engine speed whereby a stepwise change in engine output torque can be avoided, wherein said compensating means is means for momentarily decreasing the quantity of fuel supply when operation of the second fuel injection valve means is stopped for the light load engine operation.

3. An engine intake system in accordance with claim 2 in which said compensation means is means for decreasing the quantity of fuel supply by an amount which increases in response to an increase in engine speed.

4. An engine intake system including first intake passage means leading to combustion chamber means, second intake passage means substantially separated from said first intake passage means and leading to said combustion chamber means, shut-off valve means provided in said second intake passage means for closing said second intake passage means under a light load engine operation, first fuel injection valve means provided in said first intake passage means, second fuel injection valve means provided in said second intake passage means, fuel injection control means for operating said first fuel injection valve means under a first engine operating condition and for operating said first and second fuel injection valve means under a second engine operating condition, said control means including means for determining a basic fuel supply quantity in accordance with an engine operating condition and compensating means for determining a compensation factor, which changes in accordance with engine speed, for momentarily changing the fuel supply based on said basic fuel supply quantity in a transient period between the first and second operating conditions in accordance with the engine speed so that a stepwise change in engine output torque can be avoided.

5. An engine intake system in accordance with claim 4 in which said compensating means is means for decreasing the amount of change of the quantity of fuel supply as time passes.

6. An engine intake system in accordance with claim 4 in which said compensating means includes means for momentarily increasing the quantity of fuel supply when the second fuel injection valve means is started to operate for the second engine operating condition.

7. An engine intake system in accordance with claim 6 in which said compensating means includes means for increasing the quantity of fuel supply through the first fuel injection valve means when the second fuel injection valve means is started to operate for the second engine operating condition.

8. An engine intake system in accordance with claim 4 in which said compensating means includes means for storing compensation factors which correspond to various engine speeds, and means for changing said basic fuel supply quantity in accordance with a compensation factor corresponding to the engine speed wherein the engine operating condition has started to change from one of the first and second engine operating conditions to the other.

9. An engine intake system in accordance with claim 8 in which said compensating means includes timer means and means for decreasing the compensation factor as time passes.

* * * * *